United States Patent
Wang et al.

(10) Patent No.: US 10,509,919 B1
(45) Date of Patent: Dec. 17, 2019

(54) BLOCKCHAIN-BASED TRANSACTION PROCESSING METHOD AND APPARATUS

(71) Applicant: Alibaba Group Holding Limited, George Town (KY)

(72) Inventors: Jiyuan Wang, Hangzhou (CN); Huabing Du, Hangzhou (CN); Xuebing Yan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/424,683

(22) Filed: May 29, 2019

(30) Foreign Application Priority Data

May 29, 2018 (CN) .......................... 2018 1 0531740

(51) Int. Cl.
  *G06F 7/04* (2006.01)
  *G06F 21/62* (2013.01)
  *G06Q 20/38* (2012.01)
  *G06Q 20/06* (2012.01)

(52) U.S. Cl.
  CPC ....... *G06F 21/6227* (2013.01); *G06Q 20/389* (2013.01); *G06Q 20/0658* (2013.01)

(58) Field of Classification Search
  USPC ......................................................... 726/27
  See application file for complete search history.

(56) References Cited

U.S. PATENT DOCUMENTS

| | | | |
|---|---|---|---|
| 9,892,460 B1* | 2/2018 | Winklevoss | G06Q 40/04 |
| 10,252,145 B2* | 4/2019 | Tran | H04N 5/2257 |
| 2016/0342977 A1* | 11/2016 | Lam | G06Q 20/02 |
| 2018/0039667 A1* | 2/2018 | Pierce | G06Q 20/0658 |
| 2018/0247302 A1* | 8/2018 | Armstrong | G06Q 20/3827 |
| 2018/0293556 A1* | 10/2018 | Hyun | G06Q 20/0658 |
| 2018/0349484 A1* | 12/2018 | Carlisle | G06Q 50/01 |
| 2019/0156332 A1* | 5/2019 | Christidis | G06Q 20/0658 |

FOREIGN PATENT DOCUMENTS

CN 107528882 12/2017

OTHER PUBLICATIONS

Antonopoulos, "Mastering Bitcoin—Unlocking Digital Cryptocurrencies," O'Reilly Media, Beijing Cambridge Farnham Köln Sebastopol Tokyo, 2014, XP055306939, 286 pages.

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Amare F Tabor
(74) *Attorney, Agent, or Firm* — Fish & Richardson P.C.

(57) ABSTRACT

A target transaction initiated by a member node device in a blockchain is received, where the target transaction include a reference time parameter, and where the reference time parameter is used to determine whether the target transaction is a valid transaction within a transaction validity period. Based on the reference time parameter, a determination is performed as to whether the target transaction is a valid transaction within a transaction validity period. In response to determining that the target transaction is a valid transaction within the transaction validity period, the target transaction is recorded to a generated candidate block.

14 Claims, 4 Drawing Sheets

(56) References Cited

OTHER PUBLICATIONS

Danezis et al., "Centrally Banked Cryptocurrencies," Cornell University Library, 201 Olin Lbrary Cornell University Ithaca, NY, 2015, XP081394209, pp. 1-15.
International Search Report and Written Opinion in International Application No. PCT/US2019/034243, dated Aug. 13, 2019, 13 pages.
Nakamoto, "Bitcoin: A Peer-to-Peer Electronic Cash System," www.bitcoin.org, 2005, 9 pages.

* cited by examiner

BLOCKCHAIN-BASED TRANSACTION PROCESSING METHOD AND APPARATUS

CROSS-REFERENCE TO RELATED APPLICATIONS

This application claims priority to Chinese Patent Application No. 201810531740.6, filed on May 29, 2018, which is hereby incorporated by reference in its entirety.

TECHNICAL FIELD

One or more implementations of the present specification relate to the field of blockchain technologies, and in particular, to a blockchain-based transaction processing method and apparatus.

BACKGROUND

Blockchain technology, also referred to as the distributed ledger technology, is a new technology in which computing devices jointly participate in "accounting" and jointly maintain a complete distributed database. The blockchain technology is featured by decentralization, and publicity and transparency. In the blockchain technology, each computing device can participate in database recording, and data synchronization can be quickly implemented between computing devices. In consideration of the above, the blockchain technology is used to establish a decentralized system, and various execution programs are collected in a blockchain distributed database for automatic execution. The blockchain technology has been widely applied in various fields.

SUMMARY

The present specification provides a blockchain-based transaction processing method, including: receiving a target transaction initiated by a member node device in a blockchain, where the target transaction includes a reference time parameter, and the reference time parameter is used to determine whether the target transaction is a valid transaction within a transaction validity period; determining, based on the reference time parameter, whether the target transaction is a valid transaction within the transaction validity period; and recording the target transaction to a generated candidate block if it is determined that the target transaction is a valid transaction within the transaction validity period.

Optionally, the reference time parameter is a reference time stamp generated when the target transaction is created, the transaction validity period corresponds to a numerical interval between a first value and a second value, the first value is a difference between a creation time stamp of the candidate block and a first threshold, and the second value is a sum of the creation time stamp of the candidate block and a second threshold; and the determining, based on the reference time parameter, whether the target transaction is a valid transaction within the transaction validity period includes: comparing the reference time stamp with each of the first value and the second value; and if the reference time stamp is greater than the first value and less than the second value, determining that the target transaction is a valid transaction within the transaction validity period.

Optionally, before the comparing the reference time stamp with each of the first value and the second value, the method further includes: checking whether the creation time stamp of the candidate block is greater than a creation time stamp of a latest block in the blockchain; and if yes, further comparing the reference time stamp with each of the first value and the second value.

Optionally, the reference time stamp is a system time stamp when the target transaction is created, or a reference time stamp specified by a transaction creator.

Optionally, the first threshold is greater than the second threshold.

Optionally, the reference time parameter is a reference block height value generated when the target transaction is created, the transaction validity period corresponds to a numerical interval between a third value and a block height value of the candidate block in the blockchain, and the third value is a difference between the block height value of the candidate block in the blockchain and a third threshold; and the determining, based on the reference time parameter, whether the target transaction is a valid transaction within the transaction validity period includes: comparing the reference block height value with each of the block height value of the candidate block in the blockchain and the third value; and if the reference block height value is greater than the third value and less than the block height value of the candidate block in the blockchain, determining that the target transaction is a valid transaction within the transaction validity period.

Optionally, before the comparing the reference block height value with each of the block height value of the candidate block in the blockchain and the third value, the method further includes: checking whether a block number of the candidate block is greater than a block number of a latest block in the blockchain; and if yes, further comparing the reference block height value with each of the block height value of the candidate block in the blockchain and the third value.

Optionally, the reference block height value is a largest block height value in the blockchain when the target transaction is created, or a reference block height value specified by a transaction creator.

Optionally, the target transaction further includes a unique identifier of the target transaction; and the recording the target transaction to a generated candidate block if it is determined that the target transaction is a valid transaction within the transaction validity period includes: if it is determined that the target transaction is a valid transaction within the transaction validity period, querying whether a transaction idempotent record corresponding to the unique identifier of the target transaction is stored in a predetermined transaction idempotent table, where the transaction idempotent table is used to store a transaction idempotent record corresponding to a valid transaction within the transaction validity period; and if the transaction idempotent record corresponding to the unique identifier of the target transaction is not stored in the predetermined transaction idempotent table, recording the target transaction to the candidate block.

Optionally, the transaction idempotent record indicates that a transaction corresponding to the transaction idempotent record has been successfully recorded to a distributed database of the blockchain; and the method further includes: if the target transaction is recorded to the candidate block, and after a consensus on the candidate block has been reached, the candidate block is successfully stored to the distributed database of the blockchain, generating the transaction idempotent record corresponding to the unique identifier of the target transaction, and inserting the transaction idempotent record into the transaction idempotent table.

Optionally, the method further includes: periodically deleting a transaction idempotent record of a transaction beyond the transaction validity period in the transaction idempotent table.

The present specification further provides a blockchain-based transaction processing apparatus, including: a receiving module, configured to receive a target transaction initiated by a member node device in a blockchain, where the target transaction includes a reference time parameter, and the reference time parameter is used to determine whether the target transaction is a valid transaction within a transaction validity period; a determining module, configured to determine, based on the reference time parameter, whether the target transaction is a valid transaction within the transaction validity period; and a recording module, configured to record the target transaction to a generated candidate block if it is determined that the target transaction is a valid transaction within the transaction validity period.

Optionally, the reference time parameter is a reference time stamp generated when the target transaction is created, the transaction validity period corresponds to a numerical interval between a first value and a second value, the first value is a difference between a creation time stamp of the candidate block and a first threshold, and the second value is a sum of the creation time stamp of the candidate block and a second threshold; and the determining module is configured to: compare the reference time stamp with each of the first value and the second value; and if the reference time stamp is greater than the first value and less than the second value, determine that the target transaction is a valid transaction within the transaction validity period.

Optionally, the determining module is further configured to: before comparing the reference time stamp with each of the first value and the second value, check whether the creation time stamp of the candidate block is greater than a creation time stamp of a latest block in the blockchain; and if yes, further compare the reference time stamp with each of the first value and the second value.

Optionally, the reference time stamp is a system time stamp when the target transaction is created, or a reference time stamp specified by a transaction creator.

Optionally, the first threshold is greater than the second threshold.

Optionally, the reference time parameter is a reference block height value generated when the target transaction is created, the transaction validity period corresponds to a numerical interval between a third value and a block height value of the candidate block in the blockchain, and the third value is a difference between the block height value of the candidate block in the blockchain and a third threshold; and the determining module is configured to: compare the reference block height value with each of the block height value of the candidate block in the blockchain and the third value; and if the reference block height value is greater than the third value and less than the block height value of the candidate block in the blockchain, determine that the target transaction is a valid transaction within the transaction validity period.

Optionally, the determining module is further configured to: before comparing the reference block height value with each of the block height value of the candidate block in the blockchain and the third value, check whether a block number of the candidate block is greater than a block number of a latest block in the blockchain; and if yes, further compare the reference block height value with each of the block height value of the candidate block in the blockchain and the third value.

Optionally, the reference block height value is a largest block height value in the blockchain when the target transaction is created, or a reference block height value specified by a transaction creator.

Optionally, the target transaction further includes a unique identifier of the target transaction; and the recording module is further configured to: if it is determined that the target transaction is a valid transaction within the transaction validity period, query whether a transaction idempotent record corresponding to the unique identifier of the target transaction is stored in a predetermined transaction idempotent table, where the transaction idempotent table is used to store a transaction idempotent record corresponding to a valid transaction within the transaction validity period; and if the transaction idempotent record corresponding to the unique identifier of the target transaction is not stored in the predetermined transaction idempotent table, record the target transaction to the candidate block.

Optionally, the transaction idempotent record indicates that a transaction corresponding to the transaction idempotent record has been successfully recorded to a distributed database of the blockchain; and the recording module is further configured to: if the target transaction is recorded to the candidate block, and after a consensus on the candidate block has been reached, the candidate block is successfully stored to the distributed database of the blockchain, generate the transaction idempotent record corresponding to the unique identifier of the target transaction, and insert the transaction idempotent record into the transaction idempotent table.

Optionally, the recording module is further configured to: periodically delete a transaction idempotent record of a transaction beyond the transaction validity period in the transaction idempotent table.

The present specification further provides an electronic device, including: a processor; and a memory, configured to store a machine executable instruction, where the processor reads and executes the machine executable instruction stored in the memory and corresponding to blockchain-based transaction processing control logic, to: receive a target transaction initiated by a member node device in a blockchain, where the target transaction includes a reference time parameter, and the reference time parameter is used to determine whether the target transaction is a valid transaction within a transaction validity period; determine, based on the reference time parameter, whether the target transaction is a valid transaction within the transaction validity period; and record the target transaction to a generated candidate block if it is determined that the target transaction is a valid transaction within the transaction validity period.

DESCRIPTION OF IMPLEMENTATIONS

The present specification is intended to provide a technical solution, to set a transaction validity period for a transaction sent to a blockchain, and ensure that a node device in the blockchain can record only a transaction within the transaction validity period to a candidate block.

During implementation, an operator of the blockchain can uniformly set a transaction validity period for transactions sent to the blockchain.

For example, in actual applications, the transaction validity period can be a period of time before a creation moment at which a node device (for example, a node device serving as a "ledger node") in the blockchain creates a candidate block within a current accounting period, or a period of time after a creation moment of a candidate block.

When a user creates a transaction by using a client, a reference time parameter used to determine whether the transaction is a valid transaction within the previous transaction validity period can be added to the transaction, and then the transaction is sent to the blockchain by using a node device accessed by the client.

After receiving the transaction, in a process of verifying the transaction, another node device in the blockchain can verify, based on the reference time parameter carried in the transaction, whether the transaction is a valid transaction within the transaction validity period; and record the transaction to the candidate block if the transaction is confirmed as a valid transaction within the transaction validity period.

Based on the previous technical solution, only a valid transaction within the transaction validity period can be used as a legal transaction and recorded to the candidate block, while an illegal node device in the blockchain can be prevented from initiating a replay attack on the blockchain by using an expired transaction intercepted by the illegal node device long time before, thereby improving a transaction security level of the blockchain.

The following describes the present specification by using implementations with reference to application scenarios.

Figure 1:
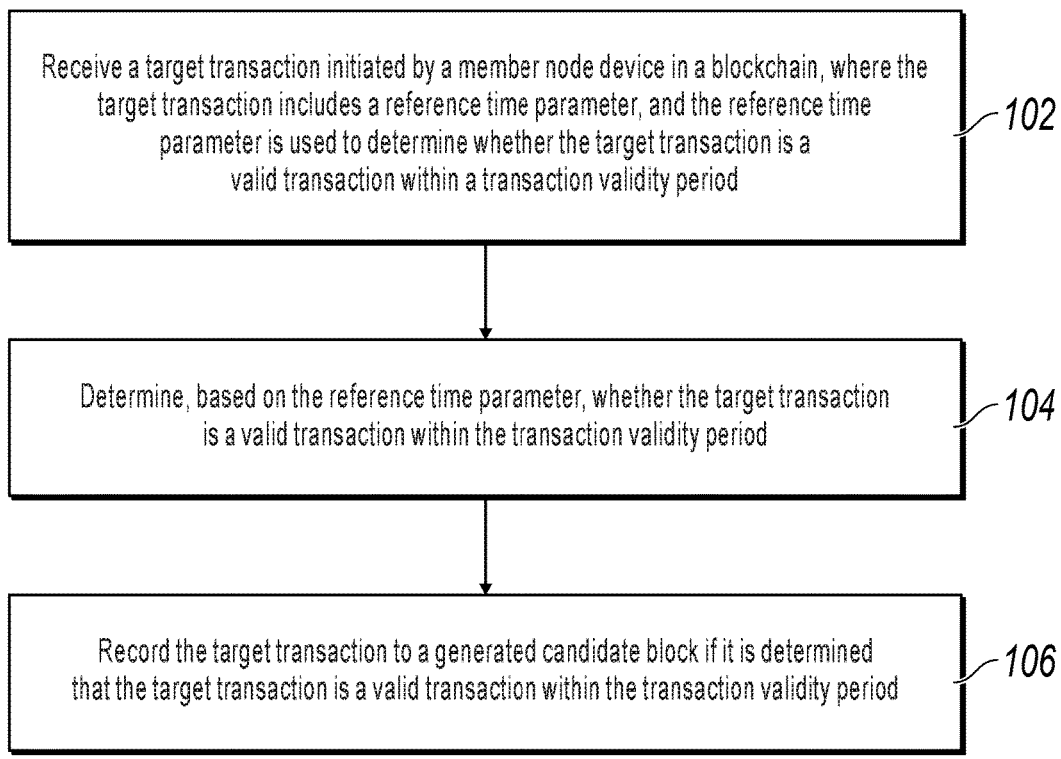
FIG. 1 is a flowchart illustrating a blockchain-based transaction processing method, according to an example implementation.

FIG. 1 shows a blockchain-based transaction processing method according to an implementation of the present specification. The method is applied to any node device in a blockchain, including the following steps:

Step 102: Receive a target transaction initiated by a member node device in a blockchain, where the target transaction includes a reference time parameter, and the reference time parameter is used to determine whether the target transaction is a valid transaction within a transaction validity period.

Step 104: Determine, based on the reference time parameter, whether the target transaction is a valid transaction within the transaction validity period.

Step 106: Record the target transaction to a generated candidate block if it is determined that the target transaction is a valid transaction within the transaction validity period.

The blockchain described in the present specification can include a private blockchain, a public blockchain, a consortium blockchain, etc. This is not specifically limited in the present specification.

For example, in a scenario, the blockchain can be a consortium blockchain consisting of a third-party payment platform server, a domestic bank server, an abroad bank server, and several user node devices serving as member devices. An operator of the consortium blockchain can rely on the consortium blockchain to online deploy online services such as a cross-border transfer and an asset transfer based on the consortium blockchain.

The transaction (e.g., a cross-border transfer or an asset transfer, etc.) described in the present specification indicates a piece of data that is created by a user by using a client of a blockchain and that needs to be finally sent to a distributed database of the blockchain.

The transaction in the blockchain is classified as a transaction in a narrow sense and a transaction in a broad sense. The transaction in a narrow sense indicates a value transfer released by the user to the blockchain. For example, in a conventional bitcoin blockchain network, the transaction can be a transfer initiated by the user in the blockchain. The transaction in a broad sense indicates service data released with a service intention by the user to the blockchain. For example, an operator can create a consortium blockchain based on an actual service requirement, and deploy other types of online services (such as a house rental service, a vehicle scheduling service, an insurance settlement service, a credit service, and a medical service) irrelative to a value transfer based on the consortium blockchain. In this type of consortium blockchain, the transaction can be a service message or a service request released with a service intention by the user in the consortium blockchain.

The target transaction is a candidate transaction that needs to be packed and recorded to the candidate block, and that is selected by the node device serving as a ledger node in the blockchain from successfully-verified legal transactions released by other member node devices.

The transaction validity period is a validity period uniformly set by an operator of the blockchain for transactions sent to the blockchain. Transactions within the validity period are considered as legal transactions that can be used as valid transactions and added to the candidate block; otherwise, transactions beyond the validity period are considered as invalid transactions that cannot be added to the candidate block.

The transaction validity period can be a time interval set based on a creation moment at which the ledger node device in the blockchain creates the candidate block within a current accounting period. For example, the transaction validity period can be a period of time before the creation moment of the candidate block, or a period of time after the creation moment of the candidate block. When obtaining a large number of transactions released by other node devices in the blockchain, the ledger node can determine, based on the transaction validity period, transactions that can be used as legal transactions and added to the generated candidate block.

The reference time parameter can be a time parameter added to a transaction and used to determine whether a transaction is a valid transaction within the transaction validity period. When performing verification on the collected transactions, with reference to the moment indicated by the reference time parameter carried in the transaction, the ledger node in the blockchain can determine whether the transaction is a valid transaction within the transaction valid period.

The reference time parameter can be a physical clock, or can be a logical clock.

The physical clock is a system time stamp read from a system or from a third-party clock server. The logical clock is a logical time stamp. In a distributed system, any automatically increasing value that can indicate an occurrence order of events (such as transactions) can be used as a logical clock.

In an implementation, in an example in which the reference time parameter is a physical clock, the reference time parameter can be a reference time stamp added to the transaction. Correspondingly, in this case, the transaction validity period can be a numerical interval between a first value and a second value, where the first value can be a difference between a creation time stamp corresponding to a creation moment of the candidate block and a first threshold, and the second value can be a sum of the creation time stamp of the candidate block and a second threshold.

For example, it is assumed that the creation time stamp of the candidate block is denoted as $B_{ts}$, the first threshold is denoted as K1, and the second threshold is denoted as K2. Then, the transaction validity period can be indicated by using a numerical interval $[B_{ts}-K1, B_{ts}+K2]$.

The first threshold indicates transaction validity duration reserved when the transaction validity period is set. The second threshold indicates a clock offset between a system time stamp of the node device releasing the transaction and a system time stamp of the node device creating the candidate block. Usually, a clock offset allowed in the blockchain network is relatively small in actual applications. In consideration of this, when the transaction validity period is set, the second threshold can be set to a threshold less than the first threshold in order of magnitude.

For example, the first threshold can be set to five days, and the second threshold can be set to 5 minutes. In this case, a transaction released within five days before the moment of creating the candidate block and a transaction released within 5 minutes after the moment of creating the candidate block are both valid transactions within the transaction validity period.

It is worthwhile to note that the reference time stamp can be manually specified by the user when the user creates the transaction by using the client, or can be automatically added by the client.

For example, in a case, when the user creates the transaction by using the client, the client can read the creation moment of the transaction from the system, then use the time stamp corresponding to the creation moment as the reference time stamp, and automatically add the time stamp to the created transaction. In another case, the user can specify a moment within the transaction validity period based on a requirement, then use a time stamp corresponding to the moment as the reference time stamp, and manually add the time stamp to the created transaction.

Certainly, in actual applications, the clock offset between the system time stamp of the node device releasing the transaction and the system time stamp of the node device creating the candidate block may not be considered when the transaction validity period is set. In this case, the transaction validity period can be a numerical interval between a first value representing the difference between the creation time stamp corresponding to the creation moment of the candidate block and the first threshold, and the creation time stamp of the candidate block.

For example, it is still assumed that the creation time stamp of the candidate block is denoted as $B_{ts}$, and the first threshold is denoted as K1. Then, the transaction validity period can be indicated by using a numerical interval $[B_{ts}-K1, B_{ts}]$.

In another implementation, in an example in which the reference time parameter is a logical clock, a block height of a block in the blockchain can be used as a logical clock in a P2P network corresponding to the blockchain. In this case, the reference time parameter can be a reference block height value added to the transaction. The transaction validity period can be a numerical interval between a block height value of the candidate block in the blockchain and a difference (a third value) between the block height value of the candidate block in the blockchain and a third threshold.

For example, it is assumed that the block height value of the candidate block in the blockchain is denoted as $B_h$, and the third threshold is denoted as K3. Then, the transaction validity period can be indicated by using a numerical interval $[B_h-K3, B_h]$.

The third threshold has a same meaning as the first threshold, indicating transaction validity duration reserved when the transaction validity period is set. However, in a scenario in which the block height value is used as a logical clock to indicate the transaction validity period, the clock offset between the system time stamp of the node device releasing the transaction and the system time stamp of the node device creating the candidate block may not be considered. Therefore, the threshold indicating the clock offset may not be added to the upper limit of the above numerical interval.

It is worthwhile to note that the reference block height value can be manually specified by the user when the user creates the transaction by using the client, or can be automatically added by the client.

For example, in a case, when the user creates the transaction by using the client, the client can read the creation moment of the transaction from the system, then further query the largest block height value in the blockchain at the creation moment, and automatically add the largest block height value to the created transaction. In another case, the user can specify a block height within the transaction validity period based on a requirement, then use a value corresponding to the block height as the reference block height value, and manually add the value to the created transaction.

Certainly, in addition to the implementation of using the block height of the block in the blockchain as a logical clock, in actual applications, other types of increasing values that can be used to describe an occurrence order of transactions can also be used as logical clocks. These values are not enumerated in the present specification one by one.

In the present specification, the transaction created by the user by using the client can be signed based on a private key held by the user, and then the transaction is broadcast and released in the P2P network of the blockchain by using the node device accessed by the client. The node device serving as the ledger node can collect a transaction broadcast and released by another node device, use the collected transaction as an unacknowledged transaction, and store the collected transaction in a local transaction pool (also referred to as a memory pool).

Further, the node device serving as the ledger node can create the candidate block within the current accounting period, perform legal verification on the transaction in the transaction pool, use a transaction passing the legal verification as a candidate transaction, and record the transaction to the created candidate block.

In actual applications, the performing verification on the transaction in the transaction pool can include identity authentication on the publisher of the transaction and a check on transaction content. The check on transaction content can further include an integrity check on the transaction content.

During implementation, when the transaction is signed, generally, calculation can be performed on the transaction to obtain a content abstract (for example, a hash value), and then the content abstract can be encrypted based on the held private key to obtain a digital signature. After receiving the signed transaction, the node device serving as the ledger node can decrypt the digital signature based on the private key used when the transaction is signed. If the node device succeeds in the decryption, it indicates that the identity authentication of the user releasing the transaction succeeds, and the transaction is a legal transaction released by the user.

In addition, the node device serving as the ledger node can further perform recalculation on the transaction to obtain a content abstract, and then match the recalculated content abstract with the original content abstract obtained by decrypting the digital signature. If the content abstract matches the original content abstract, it indicates that the integrity check on the transaction content succeeds, and the transaction content of the transaction is not illegally tampered with during the transaction transmission process.

In the present specification, in addition to the identity authentication on the publisher of the transactions in the transaction pool and the verification on the transaction content, it is further verified that, based on the reference time parameter carried in the transaction, whether the transaction in the transaction pool is a valid transaction within the transaction validity period. For a transaction in the transaction pool that passes both the identity authentication on the publisher and the verification on the transaction content, whether the transaction in the transaction pool is a valid transaction within the transaction validity period can be further verified based on the reference time parameter carried in this type of transaction.

In a shown implementation, it is assumed that the reference time parameter is a reference time stamp added to the transaction and denoted as $T_{ts}$, and the transaction validity period is a numerical interval $[B_{ts}-K1, B_{ts}+K2]$ between the difference between the creation time stamp $B_{ts}$ corresponding to the creation moment of the candidate block and the first threshold K1, and the sum of the creation time stamp $B_{ts}$ of the candidate block and the second threshold K2.

In this case, the node device serving as the ledger node can first perform a monotonic increase check on the creation time stamp of the created candidate block, to check whether the creation time stamp $B_{ts}$ of the created candidate block is greater than a creation time stamp of a latest block in the blockchain. If yes, it indicates that the candidate block meets a feature that the creation time stamp of the block in the blockchain monotonically increases, and the candidate block is a legal block.

After the candidate block passes the monotonic increase check, the node device serving as the ledger node can further read the reference time stamp $T_{ts}$ from the transaction, and compare the read reference time stamp $T_{ts}$ with each of $B_{ts}-K1$ and $B_{ts}+K2$. If $T_{ts}$ is greater than $B_{ts}-K1$ and less than $B_{ts}+K2$, the transaction can be determined as a valid transaction within the transaction validity period.

In a shown implementation, it is assumed that the reference time parameter is a reference block height value added to the transaction and denoted as $T_h$, and the transaction validity period is a numerical interval $[B_h-K3, B_h]$ between the difference between the block height value $B_h$ of the candidate block in the blockchain and the third threshold K3, and the block height value $B_h$ of the candidate block in the blockchain.

In this case, the node device serving as the ledger node can first perform a monotonic increase check on a block number of the created candidate block, to check whether the block number of the created candidate block is greater than a block number of a latest block in the blockchain. If yes, it indicates that the candidate block meets a feature that the block number of the block in the blockchain monotonically increases, and the candidate block is a legal block.

After the candidate block passes the monotonic increase check, the node device serving as the ledger node can further read the reference block height value $T_h$ from the transaction, and compare the read reference block height value $T_h$ with each of $B_h-K3$ and $B_h$. If $T_h$ is greater than $B_h-K3$ and less than $B_h$, the transaction can be determined as a valid transaction within the transaction validity period.

In the present specification, the transaction passing the identity authentication on the publisher and the verification on the transaction content in the transaction pool and the transaction passing the legal verification on the transaction can be used as candidate transactions and then packed and recorded to the created candidate block.

For example, the node device serving as the ledger node can use, as candidate transactions, all transactions passing the legal verification, and record these transactions to the candidate block; or select, as candidate transactions based on a certain principle (for example, based on a priority of a transaction), some transactions from all transactions passing the legal verification, and record these transactions to the candidate block.

In the method, only the valid transaction within the transaction validity period can be used as a legal transaction and recorded to the candidate block, while a transaction expired a long time before cannot be recorded to the candidate block for subsequent transaction execution, so that an illegal node device in the blockchain can be prevented from initiating a replay attack on the blockchain by using the expired transaction intercepted by the illegal node device long time before, thereby improving a transaction security level of the blockchain.

In the present specification, a transaction execution environment of the node device serving as the ledger node can be a multi-instance execution environment (for example, a same transaction client enables a plurality of threads that can initiate a transaction simultaneously). In the multi-instance execution environment, the same transaction can be repeatedly submitted by different instances of the same node device. Consequently, an "idempotent" problem can exist during transaction execution in the blockchain. The "idempotent" problem means that a negative impact is caused to the user after the same transaction is repeatedly executed.

For example, a "double spending" (double spending) problem in a bitcoin network is a typical "idempotent" problem. A transfer transaction signed by using the private key of the user is intercepted by an illegal node. After the transaction is executed, the illegal node can initiate a replay attack based on the intercepted transaction, and repeatedly execute the transaction in the blockchain. As a result, the same fund transfer is executed a plurality of times, causing a fund loss to the user.

In consideration of this, to reduce repeated execution of a transaction in the multi-instance execution environment, node devices serving as ledger nodes in the blockchain can jointly maintain a transaction idempotent table. For example, node devices serving as ledger nodes can jointly maintain, by using an existing consensus mechanism of the blockchain, a transaction idempotent table obtained after a consensus procedure.

The transaction idempotent table is an index record table created based on a storage record (in other words, a block record) of distributed data in the blockchain that records the valid transactions within the transaction validity period, and is used to store transaction idempotent records corresponding to all valid transactions successfully recorded to the distributed database of the blockchain.

In other words, the transaction idempotent record stored in the transaction idempotent table is used to indicate that a transaction corresponding to the transaction idempotent record has been successfully packed into the candidate block, and after a consensus on the candidate block has been reached, the candidate block can be finally used as a latest block in the blockchain and successfully added to the distributed database (in other words, a distributed ledger) in the blockchain.

Before recording a valid transaction to the candidate block, the node device serving as the ledger node can further perform an idempotent check on the transaction based on the transaction idempotent table, to determine whether the transaction is a duplicate transaction that has been successfully recorded to the distributed database of the blockchain.

In a shown implementation, in addition to the reference time parameter described above, the transaction created by the user by using the client can further carry a unique identifier created by the client for the transaction.

For example, in actual applications, a node device in the blockchain can be a node device configured with a plurality of instances, and each instance has a unique instance ID. In this case, a transaction serial number can be a unique transaction serial number including an instance ID and a generated random number.

For another example, if a node device in the blockchain is a distributed device including a plurality of devices, and each device has a unique device identifier (for example, a device ID or an IP address of the device). In this case, a transaction serial number can be a unique transaction serial number including a device identifier and a generated random number.

After determining that a collected transaction is a valid transaction within the transaction validity period, the node device serving as the ledger node can further query whether a transaction idempotent record corresponding to the unique identifier of the transaction is stored in the transaction idempotent table.

If the transaction idempotent record corresponding to the unique identifier of the transaction is stored in the transaction idempotent table, it indicates that the transaction has been successfully recorded to the distributed database of the blockchain before, and the transaction is a repeatedly initiated transaction. In this case, the transaction can be directly discarded.

However, if the transaction idempotent record corresponding to the unique identifier of the transaction is not stored in the transaction idempotent table, it indicates that the transaction has not been successfully recorded to the distributed database of the blockchain before. In this case, the node device can record the transaction to the candidate block.

In the present specification, after the candidate block is generated, the node device serving as the ledger node can further broadcast and release the generated candidate block in the blockchain, and initiate consensus processing on the transaction recorded in the candidate block in the blockchain based on a consensus algorithm supported by the blockchain, to "compete" for accounting permission.

A type of the consensus algorithm supported in the blockchain is not limited in the present specification. In actual applications, the consensus algorithm can be a standard consensus algorithm such as proof of work (PoW) and a PBFT algorithm, or can be customized by the operator of the blockchain based on an actual service requirement.

After a consensus on the candidate block has been reached, and the node device serving as the ledger node obtains the accounting permission, the candidate block can be used as the latest block in the blockchain and added to the distributed database (in other words, a distributed ledger) of the blockchain. In this case, the candidate block is used as a block in the blockchain and is permanently stored in the blockchain.

In addition, in a transaction execution environment of the node device, the node device can trigger, based on the transaction content carried in the transaction, execution of the transaction obtaining consensus and recorded in the candidate block. For example, these transactions can be used as inputs to a smart contract that has been sent to the blockchain. Transaction execution program code (for example, some function calls related to the transaction) in claims of the smart contract is executed to complete execution of the transaction in the transaction execution environment of the node device.

In a shown implementation, the target transaction is successfully recorded to the candidate block, and after a consensus on the candidate block has been reached, the candidate block can be finally used as the latest block in the blockchain and successfully stored in the distributed database of the blockchain. In this case, the target transaction has been successfully stored in the distributed database of the blockchain (in other words, the transaction is successfully chained). A transaction idempotent record corresponding to the unique identifier of the target transaction can be further generated, and the transaction idempotent record is inserted into the transaction idempotent table.

A format of the transaction idempotent record is not limited in the present specification. For example, in a method, the transaction idempotent record can be a data record including the unique identifier of the transaction. Alternatively, in another method, the unique identifier of the transaction can be directly used as the transaction idempotent record and inserted into the transaction idempotent table.

In the method, because transaction idempotent records in the transaction idempotent table cover only transaction idempotent records of all "valid transactions" within the transaction validity period, and does not need to cover transaction idempotent records of historical transactions before the transaction validity period. Therefore, the transaction idempotent table does not consume excessively large storage space, and a query performance problem caused because excessively large storage space consumed by the transaction idempotent table does not exist.

For example, for any node device that can be used as a ledger node, because the transaction idempotent table occupies relatively small storage space, the transaction idempotent table can be directly loaded and maintained in a memory of a device, instead of being stored by using a third-party storage disk. A query operation for the transaction idempotent table can be directly performed in the memory, thereby greatly improving query performance.

In addition, for all valid transactions, only those transactions that do not have transaction idempotent records in the transaction idempotent table can be successfully recorded to the candidate block. Therefore, an "idempotent" problem can be alleviated during transaction execution in the blockchain, and a playback attack initiated by some illegal nodes by using an intercepted valid transaction within the transaction validity period can be effectively prevented, thereby reducing repeated execution of the same valid transaction.

In addition, in a scenario in which a plurality of instances are configured for the node device in the blockchain or the node device is a distributed device, the following problem of repeated execution of a same transaction can also be effectively alleviated: A same valid transaction is concurrently released by different instances or different sub-devices in the distributed device.

In the present specification, because the transaction idempotent table is used to maintain the transaction idempotent record corresponding to the "valid transaction" within the transaction validity period, in actual applications, member node devices jointly maintaining the transaction idempotent table can periodically perform deletion processing, to delete a transaction idempotent record of a transaction beyond the transaction validity period from the transaction idempotent table.

For example, the transaction validity period is a time interval set based on the creation moment of the candidate block created by the ledger node device in the blockchain in the current accounting period. Because the candidate block is periodically created, the transaction validity period is also a periodic dynamic time period. In this case, when creating a new candidate block in a next accounting period, the node device can redetermine the transaction validity period, and then actively search the transaction idempotent table for a transaction idempotent record of a transaction beyond the redetermined transaction validity period. For example, whether the transaction falls beyond the redetermined transaction validity period can still be determined based on the reference time parameter in the transaction. A specific implementation process is omitted here.

Further, these found transaction idempotent records can be deleted to dynamically update and maintain the transaction idempotent records maintained in the transaction idempotent table. This ensures that the transaction idempotent records in the transaction idempotent table are all transaction idempotent records corresponding to the valid transactions within the current transaction validity period.

Figure 2:
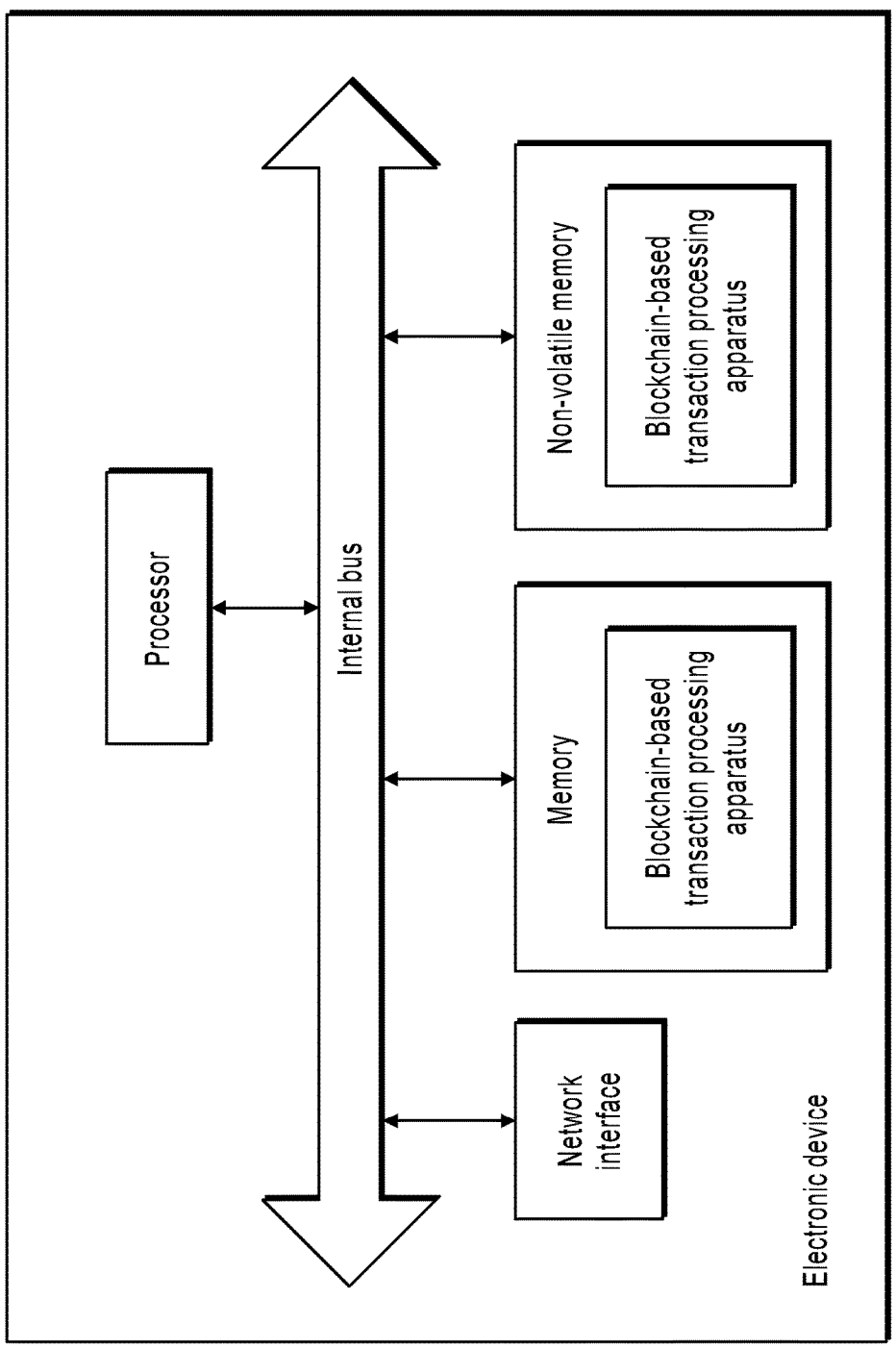
FIG. 2 is a schematic structural diagram illustrating an electronic device, according to an example implementation.

The present application further provides a blockchain-based transaction processing apparatus implementation corresponding to the previous method implementation. Implementations of the blockchain-based transaction processing apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor of an electronic device in which the apparatus is located. In terms of hardware, FIG. 2 is a hardware structural diagram illustrating an electronic device in which the blockchain-based transaction processing apparatus is located according to the present specification. In addition to a processor, a memory, a network interface, and a non-volatile memory shown in FIG. 2, the electronic device in which the apparatus is located in the present implementation can usually include other hardware based on an actual function of the electronic device. Details are omitted here for simplicity.

Figure 3:
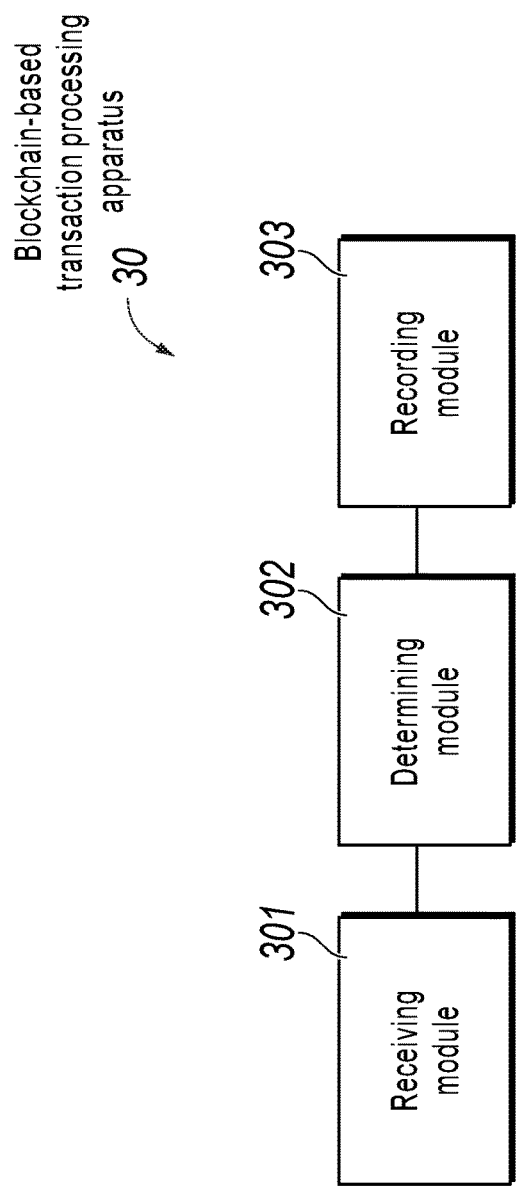
FIG. 3 is a block diagram illustrating a blockchain-based transaction processing apparatus, according to an example implementation.

FIG. 3 is a block diagram illustrating a blockchain-based transaction processing apparatus, according to an example implementation of the present specification.

Referring to FIG. 3, the blockchain-based transaction processing apparatus 30 can be applied to the electronic device shown in FIG. 2, and includes a receiving module 301, a determining module 302, and a recoding module 303.

The receiving module 301 is configured to receive a target transaction initiated by a member node device in a blockchain, where the target transaction includes a reference time parameter, and the reference time parameter is used to determine whether the target transaction is a valid transaction within a transaction validity period.

The determining module 302 is configured to determine, based on the reference time parameter, whether the target transaction is a valid transaction within the transaction validity period.

The recording module 303 is configured to record the target transaction to a generated candidate block if it is determined that the target transaction is a valid transaction within the transaction validity period.

In the present implementation, the reference time parameter is a reference time stamp generated when the target transaction is created, the transaction validity period corresponds to a numerical interval between a first value and a second value, the first value is a difference between a creation time stamp of the candidate block and a first threshold, and the second value is a sum of the creation time stamp of the candidate block and a second threshold; and the determining module 302 is configured to: compare the reference time stamp with each of the first value and the second value; and if the reference time stamp is greater than the first value and less than the second value, determine that the target transaction is a valid transaction within the transaction validity period.

In the present implementation, the determining module 302 is further configured to: before comparing the reference time stamp with each of the first value and the second value, check whether the creation time stamp of the candidate block is greater than a creation time stamp of a latest block in the blockchain; and if yes, further compare the reference time stamp with each of the first value and the second value.

In the present implementation, the reference time stamp is a system time stamp when the target transaction is created, or a reference time stamp specified by a transaction creator.

In the present implementation, the first threshold is greater than the second threshold.

In the present implementation, the reference time parameter is a reference block height value generated when the target transaction is created, the transaction validity period corresponds to a numerical interval between a third value and a block height value of the candidate block in the blockchain, and the third value is a difference between the block height value of the candidate block in the blockchain and a third threshold; and the determining module 302 is configured to: compare the reference block height value with each of the block height value of the candidate block in the blockchain and the third value; and if the reference block height value is greater than the third value and less than the block height value of the candidate block in the blockchain, determine that the target transaction is a valid transaction within the transaction validity period.

In the present implementation, the determining module 302 is further configured to: before comparing the reference block height value with each of the block height value of the candidate block in the blockchain and the third value, check whether a block number of the candidate block is greater than a block number of a latest block in the blockchain; and if yes, further compare the reference block height value with each of the block height value of the candidate block in the blockchain and the third value.

In the present implementation, the reference block height value is a largest block height value in the blockchain when the target transaction is created, or a reference block height value specified by a transaction creator.

In the present implementation, the target transaction further includes a unique identifier of the target transaction; and the recording module 303 is further configured to: if it is determined that the target transaction is a valid transaction within the transaction validity period, query whether a transaction idempotent record corresponding to the unique identifier of the target transaction is stored in a predetermined transaction idempotent table, where the transaction idempotent table is used to store a transaction idempotent record corresponding to a valid transaction within the transaction validity period; and if the transaction idempotent record corresponding to the unique identifier of the target transaction is not stored in the predetermined transaction idempotent table, record the target transaction to the candidate block.

In the present implementation, the transaction idempotent record indicates that a transaction corresponding to the transaction idempotent record has been successfully recorded to a distributed database of the blockchain; and the recording module 303 is further configured to: if the target transaction is recorded to the candidate block, and after a consensus on the candidate block has been reached, the candidate block is successfully stored to the distributed database of the blockchain, generate the transaction idempotent record corresponding to the unique identifier of the target transaction, and insert the transaction idempotent record into the transaction idempotent table.

In the present implementation, the recording module 303 is further configured to: periodically delete a transaction idempotent record of a transaction beyond the transaction validity period in the transaction idempotent table.

For an implementation process of functions and roles of modules in the apparatus, references can be made to an implementation process of a corresponding step in the previous method. Details are omitted here for simplicity.

An apparatus implementation basically corresponds to a method implementation. For related parts, references can be made to related descriptions in the method implementation. The previously described apparatus implementation is merely an example. The modules described as separate components may or may not be physically separate, and components displayed as modules may or may not be physical modules, in other words, the components can be located in one position, or can be distributed on a plurality of network modules. Some or all of the modules can be selected based on actual requirements to achieve the objectives of the solutions of the present specification. A person of ordinary skill in the art can understand and implement the solutions of the present specification without creative efforts.

The system, apparatus, or module illustrated in the previous implementations can be implemented by using a computer chip or an entity, or can be implemented by using a product having a certain function. A typical implementation device is a computer. The computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The present application further provides an electronic device implementation corresponding to the previous method implementation. The electronic device includes a processor and a memory configured to store a machine executable instruction. The processor and the memory are generally connected to each other by using an internal bus. In another possible implementation, the device can further include an external interface, to communicate with another device or component.

In the present implementation, the processor reads and executes the machine executable instruction stored in the memory and corresponding to blockchain-based transaction processing control logic, to: receive a target transaction initiated by a member node device in a blockchain, where the target transaction includes a reference time parameter, and the reference time parameter is used to determine whether the target transaction is a valid transaction within a transaction validity period; determine, based on the reference time parameter, whether the target transaction is a valid transaction within the transaction validity period; and record the target transaction to a generated candidate block if it is determined that the target transaction is a valid transaction within the transaction validity period.

In the present implementation, the reference time parameter is a reference time stamp generated when the target transaction is created, the transaction validity period corresponds to a numerical interval between a first value and a second value, the first value is a difference between a creation time stamp of the candidate block and a first threshold, and the second value is a sum of the creation time stamp of the candidate block and a second threshold; and the processor reads and executes the machine executable instruction stored in the memory and corresponding to the blockchain-based transaction processing control logic, to: compare the reference time stamp with each of the first value and the second value; and if the reference time stamp is greater than the first value and less than the second value, determine that the target transaction is a valid transaction within the transaction validity period.

In the present implementation, the processor reads and executes the machine executable instruction stored in the memory and corresponding to the blockchain-based transaction processing control logic, to: before comparing the reference time stamp with each of the first value and the second value, check whether the creation time stamp of the candidate block is greater than a creation time stamp of a latest block in the blockchain; and if yes, further compare the reference time stamp with each of the first value and the second value.

In the present implementation, the reference time parameter is a reference block height value generated when the target transaction is created, the transaction validity period corresponds to a numerical interval between a third value and a block height value of the candidate block in the blockchain, and the third value is a difference between the block height value of the candidate block in the blockchain and a third threshold; and the processor reads and executes the machine executable instruction stored in the memory and corresponding to the blockchain-based transaction processing control logic, to: compare the reference block height value with each of the block height value of the candidate block in the blockchain and the third value; and if the reference block height value is greater than the third value and less than the block height value of the candidate block in the blockchain, determine that the target transaction is a valid transaction within the transaction validity period.

In the present implementation, the processor reads and executes the machine executable instruction stored in the memory and corresponding to the blockchain-based transaction processing control logic, to: before comparing the reference block height value with each of the block height value of the candidate block in the blockchain and the third value, check whether a block number of the candidate block is greater than a block number of a latest block in the blockchain; and if yes, further compare the reference block height value with each of the block height value of the candidate block in the blockchain and the third value.

In the present implementation, the target transaction further includes a unique identifier of the target transaction; and the processor reads and executes the machine executable instruction stored in the memory and corresponding to the blockchain-based transaction processing control logic, to: if it is determined that the target transaction is a valid transaction within the transaction validity period, query whether a transaction idempotent record corresponding to the unique identifier of the target transaction is stored in a predetermined transaction idempotent table, where the transaction idempotent table is used to store a transaction idempotent record corresponding to a valid transaction within the transaction validity period; and if the transaction idempotent record corresponding to the unique identifier of the target transaction is not stored in the predetermined transaction idempotent table, record the target transaction to the candidate block.

In the present implementation, the transaction idempotent record indicates that a transaction corresponding to the transaction idempotent record has been successfully recorded to a distributed database of the blockchain; and the processor reads and executes the machine executable instruction stored in the memory and corresponding to the blockchain-based transaction processing control logic, to: if the target transaction is recorded to the candidate block, and after a consensus on the candidate block has been reached, the candidate block is successfully stored to the distributed database of the blockchain, generate the transaction idempotent record corresponding to the unique identifier of the target transaction, and insert the transaction idempotent record into the transaction idempotent table.

In the present implementation, the processor reads and executes the machine executable instruction stored in the memory and corresponding to the blockchain-based transaction processing control logic, to: periodically delete a transaction idempotent record of a transaction beyond the transaction validity period in the transaction idempotent table.

A person skilled in the art can easily figure out another implementation of the present specification after thinking over the present specification and practicing the present disclosure here. The present specification is intended to cover any variations, uses, or adaptations of the present specification. These variations, uses, or adaptations follow the general principles of the present specification and include common knowledge or conventional techniques that are not disclosed in the technical field of the present specification. The present specification and the implementations are merely considered as examples. The actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

Figure 4:
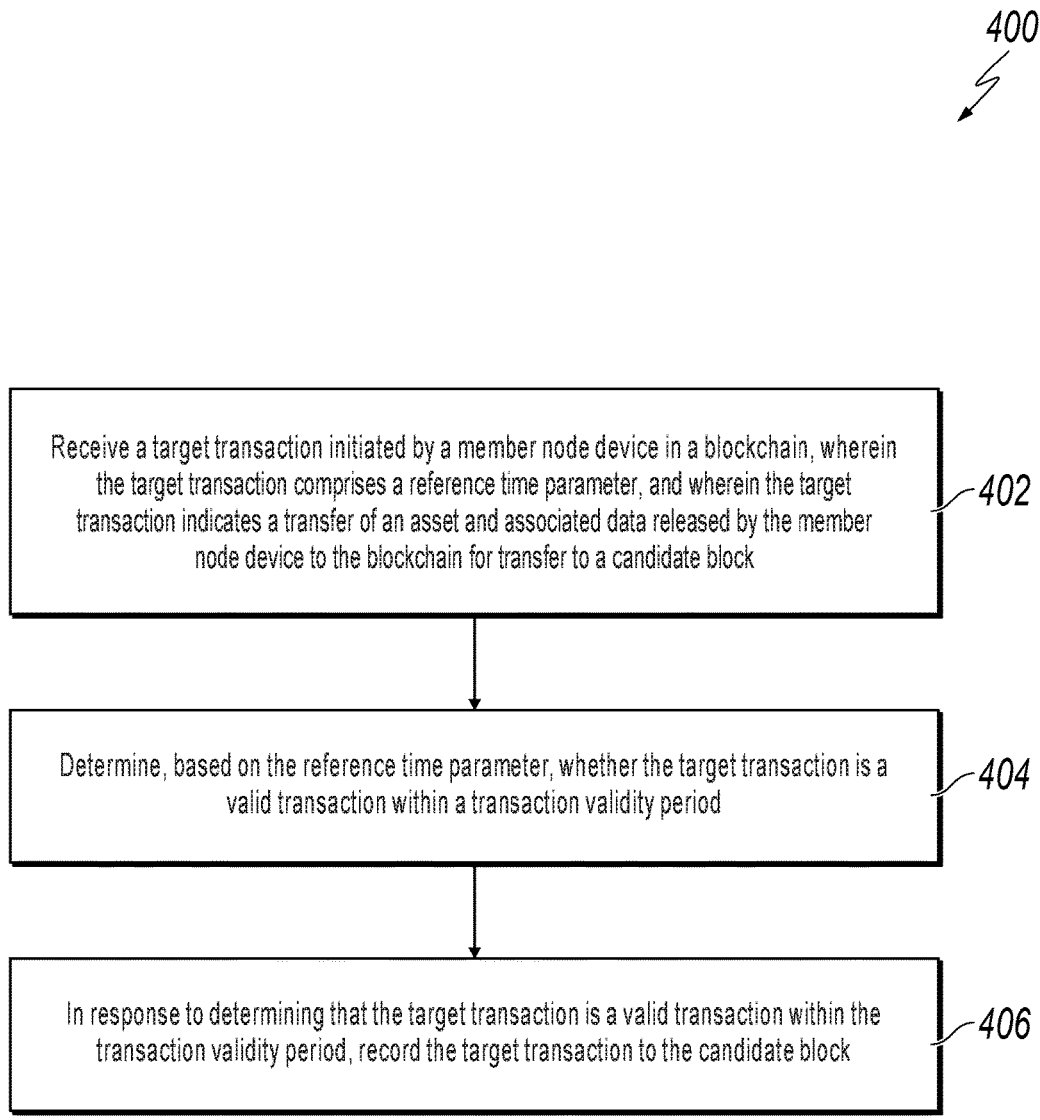
FIG. 4 is a flowchart illustrating an example of a computer-implemented method for blockchain-based transaction processing, according to an implementation of the present disclosure.

FIG. 4 is a flowchart illustrating an example of a computer-implemented method 400 for blockchain-based transaction processing, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a target transaction initiated by a member node device in a blockchain is received, wherein the target transaction comprises a reference time parameter, and wherein the target transaction indicating a transfer of an asset and associated data released by the member node device to the blockchain for transfer to a candidate block.

In some implementations, the reference time parameter is a reference time stamp generated when the target transaction is created, where the transaction validity period corresponds to a numerical interval between a first value and a second value, where the first value is a difference between a creation time stamp of the candidate block and a first threshold, and where the second value is a sum of the creation time stamp of the candidate block and a second threshold.

In some implementations, the reference time parameter is a reference block height value generated when the target transaction is created, where the transaction validity period corresponds to a numerical interval between a third value and a block height value of the candidate block in the blockchain, where the third value is a difference between the block height value of the candidate block in the blockchain and a third threshold, and where determining, based on the reference time parameter, whether the target transaction is the valid transaction within the transaction validity period comprises: 1) comparing the reference block height value with each of the block height value of the candidate block in the blockchain and the third value to determine whether the reference block height value is greater than the third value and less than the block height value of the candidate block in the blockchain and 2) in response to determining that the reference block height value is greater than the third value and less than the block height value of the candidate block in the blockchain, determining that the target transaction is a valid transaction within the transaction validity period.

In some implementations, the target transaction further comprises a unique identifier of the target transaction, where recording the target transaction to the candidate block in response to determining that the target transaction is the valid transaction within the transaction validity period comprises: 1) in response to determining that the target transaction is a valid transaction within the transaction validity period, querying whether a transaction idempotent record corresponding to the unique identifier of the target transaction is stored in a predetermined transaction idempotent table, where the predetermined transaction idempotent table is used to store a transaction idempotent record corresponding to a valid transaction within the transaction validity period and 2) in response to determining that the transaction idempotent record corresponding to the unique identifier of the target transaction is not stored in the predetermined transaction idempotent table, recording the target transaction to the candidate block.

In some implementations, the transaction idempotent record indicates that a transaction corresponding to the transaction idempotent record has been successfully recorded to a distributed database of the blockchain; and where the method further comprises: 1) in response to determining that the target transaction is recorded to the candidate block, and that a consensus on the candidate block has been reached and the candidate block is successfully stored to the distributed database of the blockchain, generating the transaction idempotent record corresponding to the unique identifier of the target transaction and 2) inserting the transaction idempotent record into the predetermined transaction idempotent table. From 402, method 400 proceeds to 404.

At 404, based on the reference time parameter, whether the target transaction is a valid transaction within a transaction validity period is determined.

In some implementations, determining, based on the reference time parameter, whether the target transaction is the valid transaction within the transaction validity period comprises: 1) comparing the reference time stamp with each of the first value and the second value to determine whether the reference time stamp is greater than the first value and less than the second value, determining that the target transaction is a valid transaction within the transaction validity period and 2) in response to determining that the reference time stamp is greater than the first value and less than the second value, determining that the target transaction is a valid transaction within the transaction validity period.

In some implementations, before comparing the reference block height value with each of the block height value of the candidate block in the blockchain and the third value, the method 400 further comprises: 1) determining whether a block number of the candidate block is greater than a block number of a latest block in the blockchain and 2) in response to determining that the block number of the candidate block is greater than the block number of a latest block in the blockchain, comparing the reference block height value with each of the block height value of the candidate block in the blockchain and the third value. From 404, method 400 proceeds to 406.

At 406, in response to determining that the target transaction is a valid transaction within the transaction validity period, recording the target transaction to the candidate block. After 420, method 400 can stop.

The described subject matter provides various technical advantages and effects. For example, in some implementations, only a valid transaction within the transaction validity period can be used as a legal transaction and recorded to the candidate block, while a transaction previously expired cannot be recorded to the candidate block for subsequent transaction execution, so that an illegal node device in the blockchain can be prevented from initiating a replay attack on the blockchain by using the expired transaction previously intercepted by the illegal node device, thereby improving a transaction security level of the blockchain. A transaction passing the identity authentication on the publisher and the verification on the transaction content in the transaction pool and the transaction passing the legal verification on the transaction can be used as candidate transactions and then packed and recorded to the created candidate block. Here, the node device serving as the ledger node can use, as candidate transactions, all transactions passing legal verification, and record these transactions to the candidate block; or select, as candidate transactions based on a certain principle (for example, based on a priority of a transaction), some transactions from all transactions passing the legal verification, and record these transactions to the candidate block.

A transaction execution environment of the node device serving as the ledger node can be a multi-instance execution environment (for example, a same transaction client enables a plurality of threads that can initiate a transaction simultaneously). In the multi-instance execution environment, the same transaction can be repeatedly submitted by different instances of the same node device. Consequently, an "idempotent" problem can exist during transaction execution in the blockchain. The "idempotent" problem means that a negative impact is caused to the user after the same transaction is repeatedly executed. For example, a "double spending" (double spending) problem in a bitcoin network is a typical "idempotent" problem. Here, a transfer transaction signed by using the private key of the user is intercepted by an illegal node. After the transaction is executed, the illegal node can initiate a replay attack based on the intercepted transaction, and repeatedly execute the transaction in the blockchain. As a result, the same fund transfer is executed a plurality of times, causing a fund loss to the user. In consideration of this, to reduce repeated execution of a transaction in the multi-instance execution environment, node devices serving as ledger nodes in the blockchain can jointly maintain a transaction idempotent table. For example, node devices serving as ledger nodes can jointly maintain, by using an existing consensus mechanism of the blockchain, a transaction idempotent table obtained after a consensus procedure. The transaction idempotent table is an index record table created based on a storage record (in other words, a block record) of distributed data in the blockchain that records the valid transactions within the transaction validity period, and is used to store transaction idempotent records corresponding to all valid transactions successfully recorded to the distributed database of the blockchain. In other words, the transaction idempotent record stored in the transaction idempotent table is used to indicate that a transaction corresponding to the transaction idempotent record has been successfully packed into the candidate block, and after a consensus on the candidate block has been reached, the candidate block can be finally used as a latest block in the blockchain and successfully added to the distributed database (in other words, a distributed ledger) in the blockchain. In some implementations, before recording a valid transaction to the candidate block, the node device serving as the ledger node can further perform an idempotent check on the transaction based on the transaction idempotent table, to determine whether the transaction is a duplicate transaction that has been successfully recorded to the distributed database of the blockchain.

In some implementations, in addition to the reference time parameter described above, the transaction created by the user by using the client can further carry a unique identifier created by the client for the transaction. For example, in actual applications, a node device in the blockchain can be a node device configured with a plurality of instances, and each instance has a unique instance ID. In this case, a transaction serial number can be a unique transaction serial number including an instance ID and a generated random number. As another example, if a node device in the blockchain is a distributed device including a plurality of devices, each device can have a unique device identifier (for example, a device ID or an IP address of the device). In this case, a transaction serial number can be a unique transaction serial number including a device identifier and a generated random number. After determining that a collected transaction is a valid transaction within the transaction validity period, the node device serving as the ledger node can further query whether a transaction idempotent record corresponding to the unique identifier of the transaction is stored in the transaction idempotent table. If the transaction idempotent record corresponding to the unique identifier of the transaction is stored in the transaction idempotent table, it indicates that the transaction has been successfully recorded to the distributed database of the blockchain before, and the transaction is a repeatedly initiated transaction. In this case, the transaction can be directly discarded. However, if the transaction idempotent record corresponding to the unique identifier of the transaction is not stored in the transaction idempotent table, it indicates that the transaction has not been successfully recorded to the distributed database of the blockchain before. In this case, the node device can record the transaction to the candidate block.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing blockchain-based transactions, comprising:
    receiving a target transaction initiated by a member node device in a blockchain, wherein the target transaction comprises a reference time parameter, wherein the reference time parameter is a reference time stamp generated when the target transaction is created, wherein a transaction validity period corresponds to a numerical interval between a first value and a second value, wherein the first value is a difference between a creation time stamp of a candidate block and a first threshold, and wherein the second value is a sum of the creation time stamp of the candidate block and a second threshold, and wherein the reference time parameter is used to determine whether the target transaction is a valid transaction within the transaction validity period;
    determining, based on the reference time parameter, whether the target transaction is a valid transaction within the transaction validity period, wherein determining whether the target transaction is the valid transaction period comprises:
        comparing the reference time stamp with each of the first value and the second value to determine whether the reference time stamp is greater than the first value and less than the second value, and
        in response to determining that the reference time stamp is greater than the first value and less than the second value, determining that the target transaction is a valid transaction within the transaction validity period; and
    in response to determining that the target transaction is a valid transaction within the transaction validity period, recording the target transaction to a generated candidate block.

2. The computer-implemented method of claim 1, wherein the reference time parameter is a reference block height value generated when the target transaction is created, wherein the transaction validity period corresponds to a numerical interval between a third value and a block height value of the candidate block in the blockchain, wherein the third value is a difference between the block height value of the candidate block in the blockchain and a third threshold, and wherein determining, based on the reference time parameter, whether the target transaction is the valid transaction within the transaction validity period comprises:
    comparing the reference block height value with each of the block height value of the candidate block in the blockchain and the third value to determine whether the reference block height value is greater than the third value and less than the block height value of the candidate block in the blockchain; and
    in response to determining that the reference block height value is greater than the third value and less than the block height value of the candidate block in the blockchain, determining that the target transaction is a valid transaction within the transaction validity period.

3. The computer-implemented method of claim 2, wherein before comparing the reference block height value with each of the block height value of the candidate block in the blockchain and the third value, the method further comprises:
    determining whether a block number of the candidate block is greater than a block number of a latest block in the blockchain; and
    in response to determining that the block number of the candidate block is greater than the block number of a latest block in the blockchain, comparing the reference block height value with each of the block height value of the candidate block in the blockchain and the third value.

4. The computer-implemented method of claim 3, wherein the target transaction further comprises a unique identifier of the target transaction, wherein recording the target transaction to the candidate block in response to determining that the target transaction is the valid transaction within the transaction validity period comprises:
    in response to determining that the target transaction is a valid transaction within the transaction validity period, querying whether a transaction idempotent record corresponding to the unique identifier of the target transaction is stored in a predetermined transaction idempotent table, wherein the predetermined transaction idempotent table is used to store a transaction idempotent record corresponding to a valid transaction within the transaction validity period; and
    in response to determining that the transaction idempotent record corresponding to the unique identifier of the target transaction is not stored in the predetermined transaction idempotent table, recording the target transaction to the candidate block.

5. The computer-implemented method of claim 4, wherein the transaction idempotent record indicates that a transaction corresponding to the transaction idempotent record has been successfully recorded to a distributed database of the blockchain; and
    wherein the method further comprises:
        in response to determining that the target transaction is recorded to the candidate block, and that a consensus on the candidate block has been reached and the candidate block is successfully stored to the distributed database of the blockchain, generating the transaction idempotent record corresponding to the unique identifier of the target transaction; and
        inserting the transaction idempotent record into the predetermined transaction idempotent table.

6. A non-transitory, computer-readable medium storing one or more instructions executable by a computer system to perform operations comprising:
    receiving a target transaction initiated by a member node device in a blockchain, wherein the target transaction comprises a reference time parameter, wherein the reference time parameter is a reference time stamp generated when the target transaction is created, wherein a transaction validity period corresponds to a numerical interval between a first value and a second value, wherein the first value is a difference between a creation time stamp of a candidate block and a first threshold, and wherein the second value is a sum of the creation time stamp of a candidate block and a second threshold, and wherein the reference time parameter is used to determine whether the target transaction is a valid transaction within the transaction validity period;
    determining, based on the reference time parameter, whether the target transaction is a valid transaction within the transaction validity period, wherein determining whether the target transaction is the valid transaction comprises:
        comparing the reference time stamp with each of the first value and the second value to determine whether the reference time stamp is greater than the first value and less than the second value, and
        in response to determining that the reference time stamp is greater than the first value and less than the second value, determining that the target transaction is a valid transaction within the transaction validity period; and
    in response to determining that the target transaction is a valid transaction within the transaction validity period, recording the target transaction to a generated candidate block.

7. The non-transitory, computer-readable medium of claim 6, wherein the reference time parameter is a reference block height value generated when the target transaction is created, wherein the transaction validity period corresponds to a numerical interval between a third value and a block height value of the candidate block in the blockchain, wherein the third value is a difference between the block height value of the candidate block in the blockchain and a third threshold, and wherein determining, based on the reference time parameter, whether the target transaction is the valid transaction within the transaction validity period comprises:
    comparing the reference block height value with each of the block height value of the candidate block in the blockchain and the third value to determine whether the reference block height value is greater than the third value and less than the block height value of the candidate block in the blockchain; and
    in response to determining that the reference block height value is greater than the third value and less than the block height value of the candidate block in the blockchain, determining that the target transaction is a valid transaction within the transaction validity period.

8. The non-transitory, computer-readable medium of claim 7, wherein before comparing the reference block height value with each of the block height value of the candidate block in the blockchain and the third value, the operations further comprise:
    determining whether a block number of the candidate block is greater than a block number of a latest block in the blockchain; and
    in response to determining that the block number of the candidate block is greater than the block number of a latest block in the blockchain, comparing the reference block height value with each of the block height value of the candidate block in the blockchain and the third value.

9. The non-transitory, computer-readable medium of claim 8, wherein the target transaction further comprises a unique identifier of the target transaction, wherein recording the target transaction to the candidate block in response to determining that the target transaction is the valid transaction within the transaction validity period comprises:
    in response to determining that the target transaction is a valid transaction within the transaction validity period, querying whether a transaction idempotent record corresponding to the unique identifier of the target transaction is stored in a predetermined transaction idempotent table, wherein the predetermined transaction idempotent table is used to store a transaction idempotent record corresponding to a valid transaction within the transaction validity period; and
    in response to determining that the transaction idempotent record corresponding to the unique identifier of the target transaction is not stored in the predetermined transaction idempotent table, recording the target transaction to the candidate block.

10. The non-transitory, computer-readable medium of claim 9, wherein the transaction idempotent record indicates that a transaction corresponding to the transaction idempotent record has been successfully recorded to a distributed database of the blockchain; and
    wherein the operations further comprise:
        in response to determining that the target transaction is recorded to the candidate block, and that a consensus on the candidate block has been reached and the candidate block is successfully stored to the distributed database of the blockchain, generating the transaction idempotent record corresponding to the unique identifier of the target transaction; and
        inserting the transaction idempotent record into the predetermined transaction idempotent table.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
    receiving a target transaction initiated by a member node device in a blockchain, wherein the target transaction comprises a reference time parameter, wherein the reference time parameter is a reference time stamp generated when the target transaction is created, wherein a transaction validity period corresponds to a numerical interval between a first value and a second value, wherein the first value is a difference between a creation time stamp of a candidate block and a first threshold, and wherein the second value is a sum of the creation time stamp of the candidate block and a second threshold, and wherein the reference time parameter is used to determine whether the target transaction is a valid transaction within the transaction validity period;
    determining, based on the reference time parameter, whether the target transaction is a valid transaction within the transaction validity period, wherein determining, whether the target transaction is the valid transaction comprises:
  comparing the reference time stamp with each of the first value and the second value to determine whether the reference time stamp is greater than the first value and less than the second value, and
  in response to determining that the reference time stamp is greater than the first value and less than the second value, determining that the target transaction is a valid transaction within the transaction validity period; and
  in response to determining that the target transaction is a valid transaction within the transaction validity period, recording the target transaction to a generated candidate block.

12. The computer-implemented system of claim 11, wherein the reference time parameter is a reference block height value generated when the target transaction is created, wherein the transaction validity period corresponds to a numerical interval between a third value and a block height value of the candidate block in the blockchain, wherein the third value is a difference between the block height value of the candidate block in the blockchain and a third threshold, and wherein determining, based on the reference time parameter, whether the target transaction is the valid transaction within the transaction validity period comprises:
  comparing the reference block height value with each of the block height value of the candidate block in the blockchain and the third value to determine whether the reference block height value is greater than the third value and less than the block height value of the candidate block in the blockchain; and
  in response to determining that the reference block height value is greater than the third value and less than the block height value of the candidate block in the blockchain, determining that the target transaction is a valid transaction within the transaction validity period.

13. The computer-implemented system of claim 12, wherein before comparing the reference block height value with each of the block height value of the candidate block in the blockchain and the third value, the operations further comprise:
  determining whether a block number of the candidate block is greater than a block number of a latest block in the blockchain; and
  in response to determining that the block number of the candidate block is greater than the block number of a latest block in the blockchain, comparing the reference block height value with each of the block height value of the candidate block in the blockchain and the third value.

14. The computer-implemented system of claim 13, wherein the target transaction further comprises a unique identifier of the target transaction, wherein recording the target transaction to the candidate block in response to determining that the target transaction is the valid transaction within the transaction validity period comprises:
  in response to determining that the target transaction is a valid transaction within the transaction validity period, querying whether a transaction idempotent record corresponding to the unique identifier of the target transaction is stored in a predetermined transaction idempotent table, wherein the predetermined transaction idempotent table is used to store a transaction idempotent record corresponding to a valid transaction within the transaction validity period; and
  in response to determining that the transaction idempotent record corresponding to the unique identifier of the target transaction is not stored in the predetermined transaction idempotent table, recording the target transaction to the candidate block.

* * * * *

UNITED STATES PATENT AND TRADEMARK OFFICE
CERTIFICATE OF CORRECTION

PATENT NO. : 10,509,919 B1
APPLICATION NO. : 16/424683
DATED : December 17, 2019
INVENTOR(S) : Jiyuan Wang et al.

Page 1 of 1

It is certified that error appears in the above-identified patent and that said Letters Patent is hereby corrected as shown below:

On the Title Page

Column 2 (Other Publications), Line 5, Delete "Technica" and insert -- Technical --, therefore.

In the Claims

Column 25, Line 15, In Claim 6, delete "a candidate" and insert -- the candidate --, therefore.

Signed and Sealed this
Fourth Day of February, 2020

Andrei Iancu
*Director of the United States Patent and Trademark Office*